US006202290B1

(12) United States Patent
Kewitz et al.

(10) Patent No.: US 6,202,290 B1
(45) **Date of Patent: *Mar. 20, 2001**

(54) PRESSING DEVICE FOR JOINING WORKPIECES

(75) Inventors: Ralf Kewitz, Dusseldorf; Xuang Luong Nghiem, Krefeld, both of (DE)

(73) Assignee: Novopress GmbH Pressen und Presswerkzeuge & Co. KG (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/026,768

(22) Filed: Feb. 20, 1998

(30) Foreign Application Priority Data

Feb. 21, 1997 (DE) ........................................ 297 03 052 U

(51) Int. Cl.[7] ........................................ B23P 21/00

(52) U.S. Cl. ........................ 29/701; 29/702; 29/709; 29/714; 29/720; 29/508; 72/15.1

(58) Field of Search ........................ 29/701, 702, 709, 29/714, 715, 720, 508, 407.04; 72/15.1

(56) References Cited

U.S. PATENT DOCUMENTS

| | | | | |
|---|---|---|---|---|
| 4,418,562 | * | 12/1983 | Sakai et al. | 72/444 |
| 4,480,460 | * | 11/1984 | Bush et al. | 72/410 |
| 5,025,546 | * | 6/1991 | Gotoh et al. | 29/508 |
| 5,113,679 | * | 5/1992 | Ferraro et al. | 72/21 |
| 5,271,254 | * | 12/1993 | Gloe et al. | 72/19 |
| 5,303,462 | * | 4/1994 | Chitwood et al. | 29/705 |
| 5,335,531 | * | 8/1994 | Mann et al. | 72/416 |
| 5,490,406 | * | 2/1996 | College | 72/30.1 |
| 5,540,073 | * | 7/1996 | Kirii | 72/15.1 |
| 5,619,883 | * | 4/1997 | Dischler | 72/400 |
| 5,868,021 | * | 2/1999 | Nghiem | 72/31.04 |

FOREIGN PATENT DOCUMENTS

| | | |
|---|---|---|
| 1187870 | 10/1965 | (DE) . |
| 2136782 | 2/1973 | (DE) . |
| 3423283 | 1/1986 | (DE) . |
| 29604276 U | 6/1996 | (DE) . |
| 29613654 U | 11/1996 | (DE) . |
| 29714753 U | 11/1997 | (DE) . |
| 361630 | 9/1989 | (EP) . |
| 451806 | 4/1991 | (EP) . |
| 582543 | 7/1993 | (EP) . |

* cited by examiner

*Primary Examiner*—S. Thomas Hughes
*Assistant Examiner*—Essama Omgba
(74) *Attorney, Agent, or Firm*—Liniak, Berenato, Longacre & White, LLC

(57) ABSTRACT

The invention concerns a pressing device (1) for joining workpieces, in particular press fittings to a pipe, having an electric drive (6) and a pressing tool (2) attached replaceably thereto, and is characterized in that control parameters for the drive (6) are stored on the pressing tool (2).

18 Claims, 2 Drawing Sheets

PRESSING DEVICE FOR JOINING WORKPIECES

Figure 1:
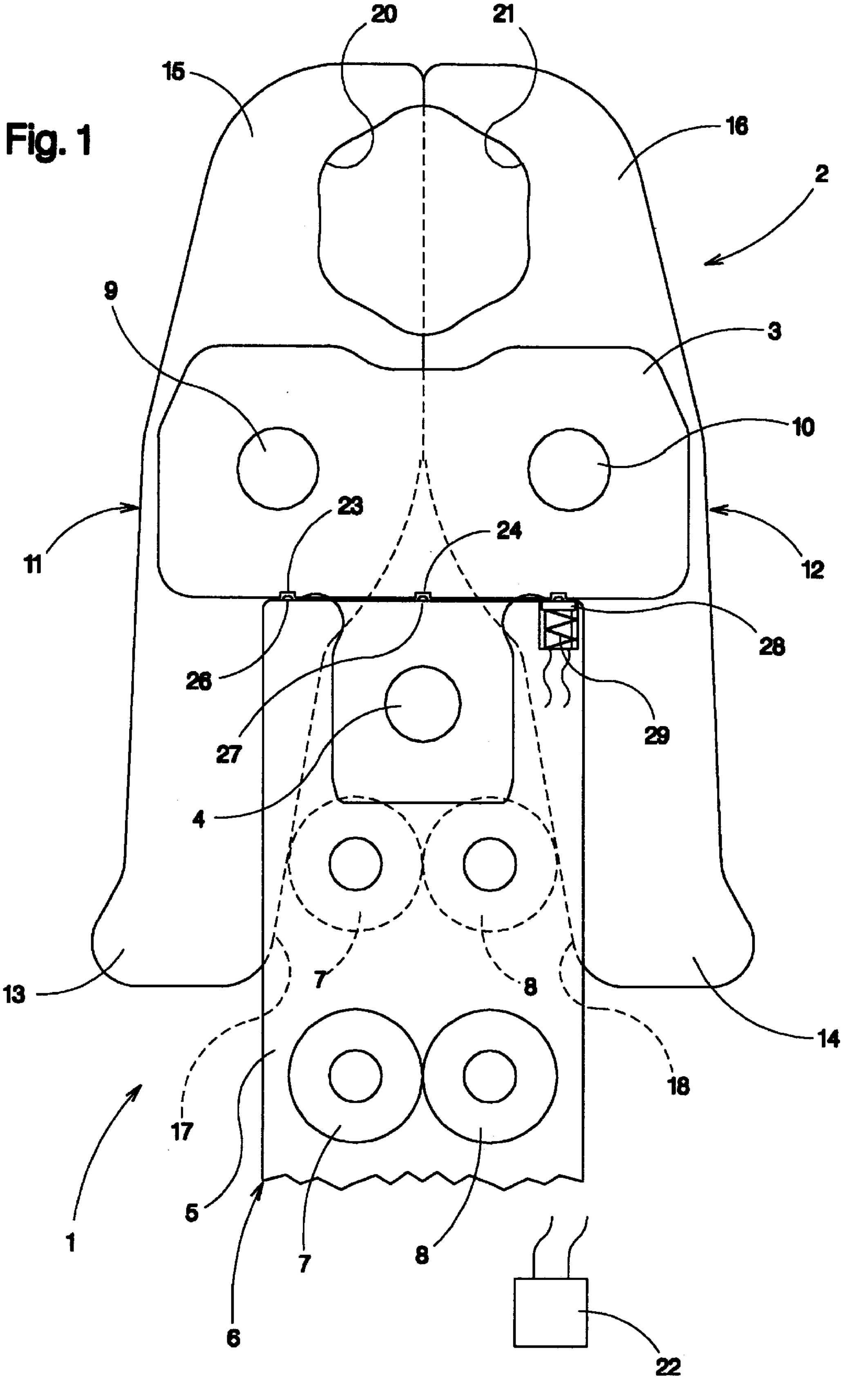

The invention concerns a pressing device for joining workpieces, in particular press fittings to a pipe, having an electric drive and a pressing tool attached replaceably thereto.

It is known, in order to join pipes, to use sleeve-like press fittings which, in order to produce a pipe joint, are slid over the pipe ends and then pressed radially together, both the press fitting and the pipe being plastically deformed. Pipe joints of this kind and the pertinent press fittings are known, for example, from DE-C-11 87 870, EP-B-0 361 630, and EP-A-0 582 543.

Pressing takes place with the aid of pressing devices such as are known in various embodiments, for example from DE-C-21 36 782, DE-A-34 23 283, EP-A-0 451 806, EP-B-0 361 630, and DE-U-296 04 276.5. The pressing devices have a pressing jaw unit having at least two or sometimes more pressing jaws, which during the pressing operation are moved radially inward to form a substantially closed pressing space. An electric drive, which can be combined with a hydraulic unit, is provided for this movement.

In the case of the known pressing devices, the jaw drive always travels toward a specific, constant final force. Final force limiters, for example in the form of an overpressure valve in the case of a hydraulic pressure cylinder, a torque coupling in the case of a rotating drive, or an overcurrent release in the case of an electric motor, are provided for this purpose. To ensure that a complete pressing takes place in all circumstances, the final force is set sufficiently high that it lies above the maximum force which normally occurs. The reason is that inaccuracies in the final force limiter have a strong effect on the final force that can actually be attained, since final force limiters do not measure directly the force proceeding from the drive, but rather a converted magnitude which represents only a fraction of the actual drive force. The high final force leads to wear on the bearing points of the pressing jaws, and on all parts acted upon by the drive.

The problems described above occur even if the drive is matched to the particular pressing tool joined to it, and also to the workpieces to be pressed therewith. Usually, however, a specific drive is used for a tool set made up of a plurality of pressing tools which are configured for pressing different press fittings. For this purpose, the drive can easily be detached from the particular pressing tool and attached to another pressing tool. In order for the drive to be usable for all the pressing tools of a tool set, the drive and the final force limiter are designed so that the drive and the final force achievable therewith are sufficient for pressing with even the largest pressing tool. The problems described above occur even with these pressing tools. They become more serious as the pressing tool becomes smaller, and thus as the deformation work to be performed decreases. The final force at which the drive is shut down is then far greater than the actual force needed. As a result, the pressing tools for small workpiece diameters must be grossly overdimensioned, i.e. they are heavier and more costly than necessary, and are subject to severe wear. But since it would be even more expensive to provide a matched drive for each pressing jaw unit (not to mention transport problems), this is perforce accepted. In previously unpublished German Patent Application 196 33 199.4, the applicant proposes, in order to eliminate the aforesaid problems, equipping the control device of the drive with an output control device which generates an output profile for the drive such that the pressing tool has, at least at the completion of pressing, less kinetic energy than without an output controller. In addition, a limit switch is provided in order to shut down the drive, at the latest, when the final pressed position is reached. The result of this feature is that the maximum force which acts on the parts moved by the drive is substantially reduced, and ideally is the same as the maximum force to be applied when deforming the workpieces. Because the jaw drive is shut down as a function of position and not as a function of force, and because the kinetic energy is reduced and ideally equals zero at the completion of pressing, high forces resulting from kinetic energy still present at that time do not occur after shutdown of the drive. The pressing tools can accordingly, in particular in the lower size range, be of much lighter dimensions, and wear is also considerably less.

In an exemplifying embodiment, the output controller is concretely influenced by a clearance sensor on the pressing tool, which detects the clearance between the end faces of the pressing jaws of the pressing tool. The result, with a corresponding circuit device, is that the output of the electric drive is reduced in a first phase by way of the phase angle. The switchover to the time phase without such reduction occurs later, the smaller the masses moved by the drive and the softer the combination of press fitting plus pipe, i.e. the smaller the diameter of said combination. Each pressing tool thus has associated with it an individually matched clearance sensor which, when the drive is connected to the particular pressing tool, ensures an appropriately matched output profile for the drive, with the purpose of building up as little kinetic energy as possible, toward the completion of pressing, in the masses moved by the drive.

It is the object of the invention to configure a pressing device of the kind cited initially in such a way that the pressing device experiences less load and is subject to less wear than the known pressing devices.

This object is achieved according to the invention, in a first alternative, by the fact that control parameters for the drive are stored on the pressing tool, preferably in a memory chip.

This approach opens up the possibility of associating with each pressing tool optimally matched control parameters for an output controller, with the goal of minimizing the load on the pressing tool by means of an output profile which is matched to the particular pressing tool. In this context, the term “control parameters” is to be understood generally. It can refer, for example, to certain coefficients which are associated with a function stored in the drive. The term “control parameters” can also, however, go further, and for example can also comprise the variables of a function or the function itself, which then, when the pressing tool and drive are connected, are passed on to the latter. The output profile can also be stored in the form of points, or in any other desired form. All that is important is that the control parameters are suitable for influencing the drive, for example by way of the phase angle, in such a way that a desired output is achieved.

The connection between the memory chip and a part of an output controller located on the drive can be accomplished by means of an electrical circuit which is automatically closed when the respective pressing tool is attached to the drive. There also exists, however, the possibility of a wireless transfer of control parameters, for example electromagnetically or optically.

There theoretically also exists the possibility of configuring the entire program for influencing the output profile, but at least the control parameters, in downloadable fashion in a control memory of an output controller. The memory chip then, however, requires a relatively large memory capacity.

In a second alternative, the object is achieved, according to the invention, by the fact that multiple output profiles are stored, one of which can in each case be set. This can be done, for example, by providing a manually actuable switch arrangement for setting the relevant output profile. It is preferred, however, for setting to be accomplished automatically, and, for this purpose, for the pressing tool to have a code which determines the output profile when the code is detected. The code defines which of the stored output profiles is utilized for the drive. This also opens up the possibility of selecting, via the code, the particular output profile which is optimum for the pressing tool having the code.

The code can be configured in a wide variety of ways, for example as projections and/or depressions which coact with binary switches on the drive. In this case, however, the number of codes is rather limited. Considerably more coding possibilities result if the code is an electrical component which is or can be coupled to the drive via a transfer member. Said component can, for example, be an electrical resistor, or can be configured as a memory chip. The latter not only allows practically unlimited coding possibilities, but also can be used to store additional parameters.

The connection between the electrical component and the drive can be configured as a circuit which is closed when the pressing tool is placed on the drive. Here again, however, there exists the possibility of a wireless transfer, for example electromagnetically or optically.

Other coding possibilities are also possible, of course, for example a magnetic or optical code, corresponding reading devices being present on the drive.

In a further embodiment of the invention, provision is made for a limit switch to be provided in order to shut down the drive, or optionally to read out the memory chip, at the latest when the final pressed position of the pressing tool is reached. Regardless of this, the pressing tool can also have a count memory which records the number of pressings. In conjunction with a corresponding display, the operator can hereby be notified when a maintenance interval is reached. After maintenance, the count can then be erased and the counting procedure can begin anew.

Figure 2:
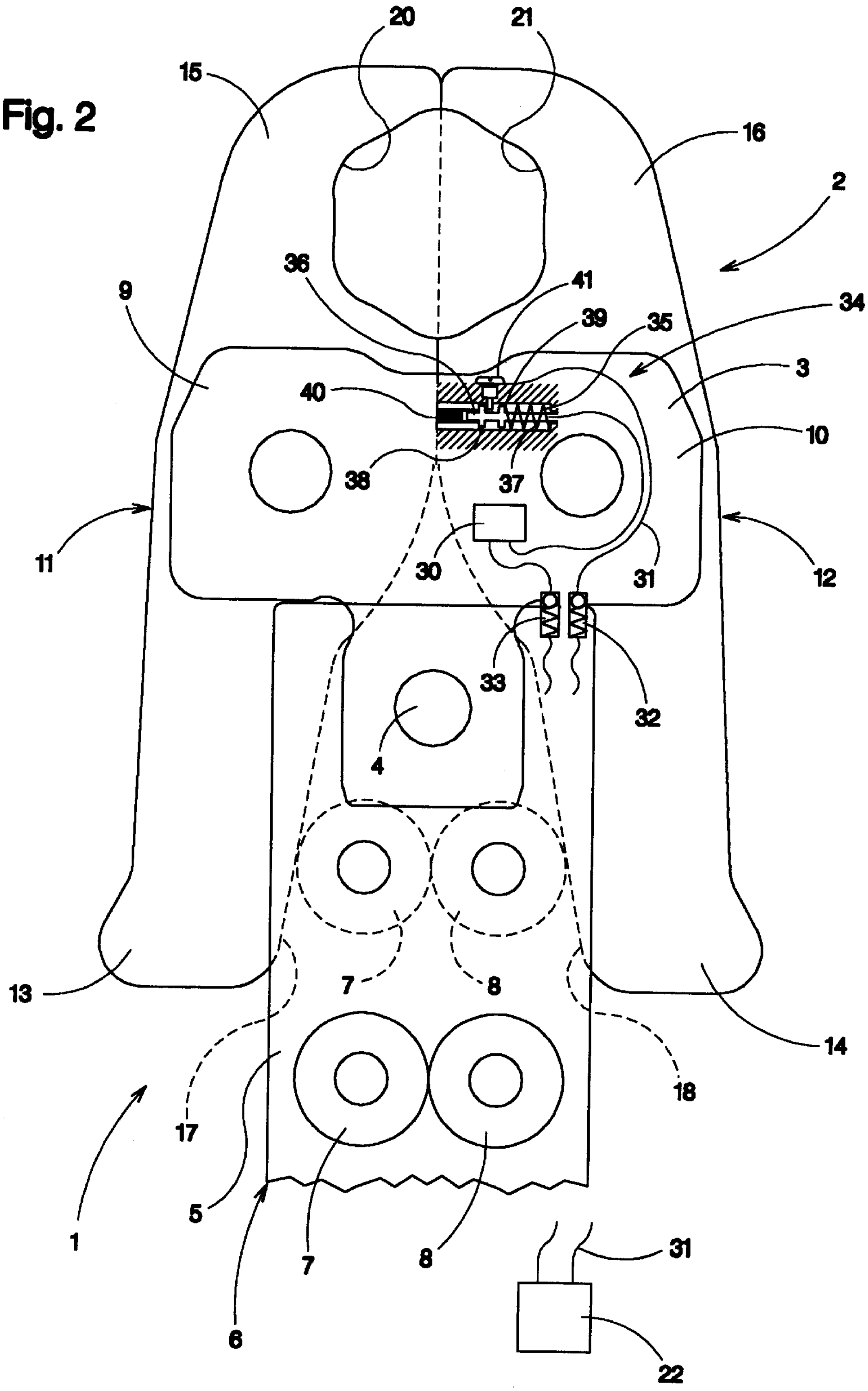

The invention is illustrated in more detail, with reference to exemplifying embodiments, in the drawings, in which FIG. 1 shows the upper part of a pressing device in a front view, with output controlled via a mechanical code;

FIG. 2 shows the pressing device as depicted in FIG. 1, having an electrical code and a limit switch.

Pressing device 1 depicted in FIGS. 1 and 2 has at its upper end a pressing tool 2. Pressing tool 2 has two T-shaped bearing plates which are arranged exactly one behind another, so that only the front bearing plate 3 is visible. In the lower region, a coupling bolt 4 passes through bearing plates 3. Placed on said coupling bolt 4 from both sides are support plates which are also arranged exactly one behind another so that only the front support plate 5 is visible. Support plates 5 are part of the drive, designated in its entirety as 6. Only the upper region of drive 6 is depicted.

Attached in the lower region of support plates 5 is an electric drive motor (not depicted here in further detail), which acts at the top on a drive rod. At the top end of the drive rod, two drive rollers 7, 8 are mounted next to one another, each freely rotatably about a horizontal axis. By means of the drive motor, drive rollers 7, 8 can be moved, vertically upward and also back down again, between support plates 5 and bearing plates 3. Coupling bolt 4 is configured removably, so that pressing tool 2 can easily be removed from drive 6 and joined to it.

Passing through bearing plates 3 in the upper region are two bearing pins 9, 10 arranged spaced apart from one another. A pressing jaw lever 11, 12 is mounted on each of bearing pins 9, 10, specifically between bearing plates 3. The two pressing jaw levers 11, 12 are configured with mirror symmetry. They have drive arms 13, 14 proceeding downward from bearing pins 9, 10, and jaw arms 15, 16 proceeding upward. Drive arms 13, 14 have drive surfaces 17, 18 which coact with drive rollers 7, 8. Jaw arms 15, 16 have, shaped onto the mutually opposing sides, semicircular recesses which form the contour of pressing jaws 20, 21.

In both Figures, pressing tool 2 is closed. For this, drive 6 was activated so that drive rollers 7, 8 were extended upward into the upper position designated by dashed lines. As a result of this extension, drive rollers 7, 8 moved against drive surfaces 17, 18, and as they moved farther, spread drive arms 13, 14 outward with the result that jaw arms 15, 16 moved together.

Drive 6 contains an output controller 22, depicted simply as a block. Stored in the output controller is a table which contains various groups of parameters, each group of parameters representing a specific output profile of the electric drive motor. The number of parameter groups corresponds to the number of different sizes of pressing tools of a tool set which can be joined to drive 6. In all cases, output is controlled via the parameters so that the electric motor, for example by means of electronic components such as a triac, thyristor, or transistor, is driven initially only at low output, so that in the takeup phase prior to the beginning of the pressing operation, excessive kinetic energy does not build up in the parts being moved. When press jaws 20, 21 come into contact with the fitting being pressed, which then extends with its longitudinal axis perpendicular to the plane of the drawing, the output is increased in accordance with the geometrical resistance of the press fitting and pipe end being pressed.

Pressing tool 2 has, on the underside of the upper part of bearing plates 3, two recesses 23, 24 which are located opposite to the upper side of support plates 5. Three microswitches 26, 27, 28, which are spring-loaded by a compression spring 29, are built into support plate 5. Two of microswitches 26, 27, 28 are each located opposite a recess 23, 24, so that microswitches 26, 27 fit into recesses 23, 24. Because they fit into recesses 23, 24, these microswitches 26, 27 are not actuated, while the third microswitch 28, for lack of an opposing recess, is actuated. Microswitches 26, 27, 28 thus constitute a certain positional combination. This positional combination leads to a certain association with a parameter group in the memory table of output controller 22, i.e. the electric motor of drive 6 is acted upon by a corresponding output profile which is optimally matched to pressing tool 2. A different positional combination of microswitches 26, 27, 28 results if one or all of recesses 23, 24 are not present, so that a corresponding number of microswitches 26, 27, 28 is actuated. The result is an association with a particular one of the other parameter combinations in the table of output controller 22. Recesses 23, 24 thus constitute a code which is read by microswitches 26, 27, 28. In this context, provision can be made for microswitches 26, 27, 28—and further microswitches can also be present—to result, when a pressing tool 2 is not mounted, in a positional combination which immobilizes the electric motor.

A code of pressing tool 2 is also provided in the case of pressing device 1 depicted in FIG. 2, but in this case by means of an electrical resistor 30 which is located in a circuit 31. Resistor 30 can be arranged at a protected point on pressing tool 2. The portion of circuit 31 contained in pressing tool 2 continues, via spring contacts 32, 33, into drive 6, and there passes into output controller 22. Output controller 22 corresponds to output controller 22 already described above and shown in FIG. 1, i.e. here again a table with groups of parameters is stored, each parameter group representing a certain output profile for the electric motor.

Resistor 30 has a resistance value which is specific for each pressing tool 2. Pressing tool 2 can thus be identified by a resistance measurement, and therefore associated with a certain parameter group in output controller 22, and consequently with a certain output profile. The resistance measurement is performed with ordinary analog/digital converters. The embodiment via the code using a resistor 30 offers a greater number of coding possibilities and, in particular, an embodiment that is more resistant to falsification.

Additionally located in circuit 31, as the limit switch, is a jaw closure sensor 34 which is arranged in the right-hand jaw arm 16. It has a blind hole 35 which is open toward the left-hand jaw arm 15. In blind hole 35, a plunger 36 is arranged in horizontally displaceable fashion. It is acted upon, via a compression spring 37, by a force directed toward the left-hand jaw arm 15.

Plunger 36 is guided in blind hole 35 via two spaced-apart annular flanges 38, 39, and ends in an electrically insulated rubber element 40. A contact screw 41 projects into the gap between the two annular flanges 38, 39. Both plunger 36 and contact screw 41 are part of circuit 31.

With pressing jaw levers 11, 12 in the open position, the opposing surfaces of drive arms 13, 14 are spaced apart. Plunger 36 thus projects outward beyond the opening of blind hole 35 with rubber element 40. The right-hand annular flange 39 is in contact against contact screw 41, so that circuit 31 is closed. A resistance measurement to identify pressing tool 2 on the basis of the resistance of resistor 30 is thus possible. When pressing jaw levers 11, 12 or pressing jaws 20, 21 close, contact occurs during the last pressing phase between rubber element 40 and the opposite side of the left-hand jaw arm 15. As a result, plunger 36 is displaced correspondingly against the action of compression spring 37, with the result that electrical contact between plunger 36 and contact screw 41 is lost. Circuit 31 is interrupted. This is detected by output controller 22, and leads to immediate shutdown of the electric motor.

It is evident that the time at which shutdown occurs can be set, by appropriately configuring the excess length of plunger 36 or of the opposite side of left-hand drive arm 13, in such a way that the electric motor shuts down, at the latest, when the final pressed position is reached; there also exists the possibility of performing the shutdown even earlier. In this case the residual kinetic energy can be used to reach the final pressed position.

To detect wire breakage in circuit 31, a second resistor, whose value clearly differs from that of resistor 30, can be installed parallel to jaw closure sensor 34 and/or to resistor 30.

Instead of resistor 30, it is also possible to provide an electronic memory chip, which opens up practically unlimited coding possibilities. This can be a serial chip with as few terminals as possible. The memory chip contains, in contrast to the memory table in output controller 22, only one single particular parameter group that is specific for pressing tool 2. When pressing tool 2 is joined to drive 6 via coupling bolt 4, the data on the memory chip are transferred into output controller 22 and stored there. When the electric motor is switched on, output is then controlled in accordance with the parameters.

The embodiment described above has the advantage that drive 6 can be combined with any desired types of pressing tool 2, since each pressing tool 2 has stored in it the parameter group specific to it. In contrast to this, the combination possibilities for the embodiments as shown in FIGS. 1 and 2 are limited to the parameter groups stored in the table of output controller 22, i.e. drive 6 then cannot be combined with new pressing tools 2 which are intended to have an output profile that is not stored in the table of output controller 22.

Further parameters and operating magnitudes can also be accommodated in the memory chip. For example, the number of pressings with a pressing tool 2 can be stored after each pressing, so as thereby to inform the operator when a maintenance interval has been reached. After maintenance has been performed, the count can then be erased and the counting operation can begin anew.

What is claimed is:

1. A pressing device for joining workpieces, comprising:

a) a drive;

b) a press tool removably attached to said drive and cooperating with said drive for joining workpieces;

c) a coding assembly carried by said press tool and storing control parameters pertaining to said press tool; and d) an output controller in communication with said coding assembly and operably associated with said drive for controlling operation of said drive based upon the control parameters.

2. The device of claim 1, wherein:

a) said drive is an electric drive.

3. The device of claim 2, wherein:

a) said coding assembly includes a memory chip.

4. The device of claim 3, wherein:

a) said memory chip is electrically connected to said output controller.

5. The device of claim 4, wherein:

a) the electrical connection is established by means selected from the group consisting of a wired electrical circuit, wireless electromagnetic connection, and wireless optical connection.

6. The device of claim 3, wherein:

a) said output controller includes a control memory; and b) the control parameters are downloadable from said memory chip to said control memory.

7. A pressing device for joining workpieces, comprising:

a) an electric drive;

b) a press tool removably attached to said drive and cooperating with said drive for joining workpieces;

c) a profile specifying assembly carried by said tool for specifying the output profile to be used by said press tool when joining workpieces; and d) an output controller in communication with said profile specifying assembly and storing a plurality of output profiles, said controller causing operation of said drive based upon the output profile specified by said profile specifying assembly from among the stored output profiles.

8. The device of claim 7, wherein:

a) said profile specifying assembly includes a code specifying the output profile.

9. The device of claim 8, wherein:

a) said code is defined by at least a first projection or depression, and said output controller includes a plurality of switches engagable with said first projection or depression for reading the code.

10. The device of claim 8, wherein:

a) said code includes an electrical or electronic component communicating with said output controller through a transfer member.

11. The device of claim 10, wherein:

a) said component is selected from the group consisting of resistors and memory chips.

12. The device of claim 11, wherein:

a) a limit switch is operably associated with said press tool for shutting down said drive or reading said memory chip when said press tool has achieved a final pressed position.

13. The device of claim 10, wherein:

a) said transfer member is an electrical circuit.

14. The device of claim 10, wherein:

a) said transfer member includes a wireless coupling.

15. The device of claim 14, wherein:

a) said wireless coupling is selected from the group consisting of electromagnetic couplings and optical couplings.

16. The device of claim 8, wherein:

a) the code is magnetically or optically detectable.

17. The device of claim 7, wherein:

a) said profile specifying assembly includes at least a first switch.

18. The device of claim 7, wherein:

a) a count memory is operably associated with said press tool for recording the number of pressing made by said tool.

* * * * *